(No Model.)
T. B. JEFFERY.
VELOCIPEDE SADDLE.
No. 496,880. Patented May 9, 1893.
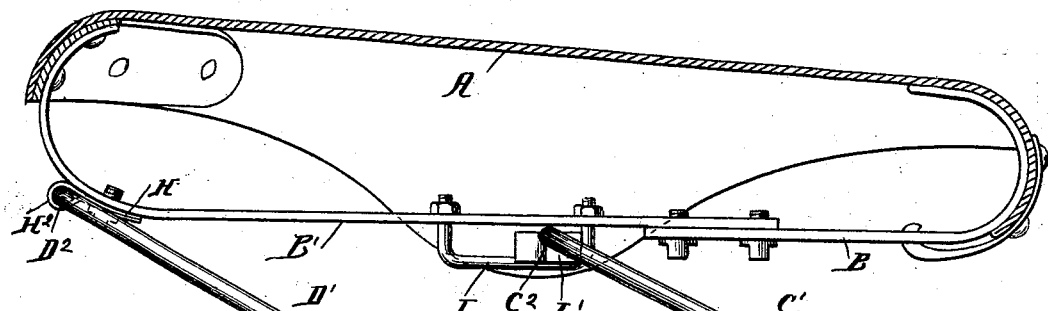
Fig. 1
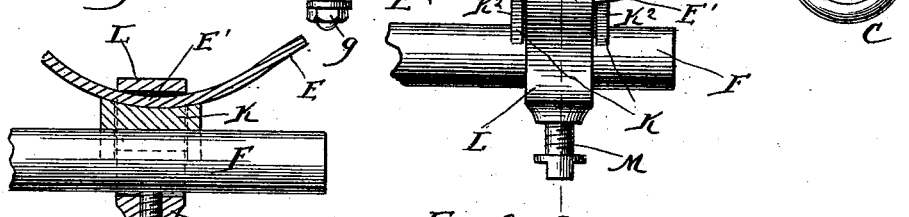
Fig. 4.
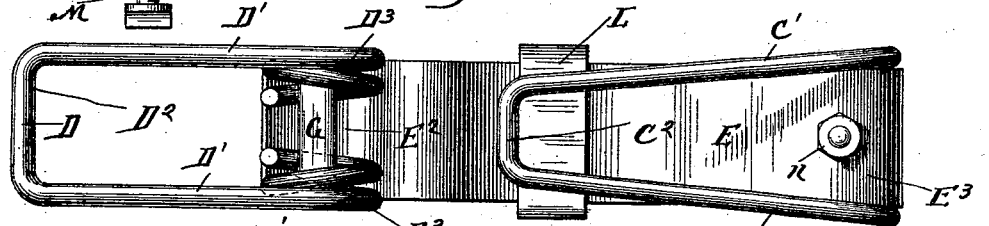
Fig. 2.
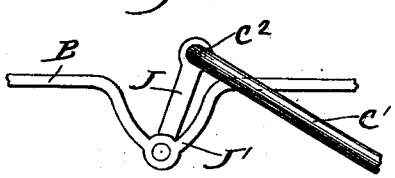
Fig. 3.
Fig. 5.
Witnesses:
Jean Elliott
Julia Usler.
Inventor:
Thos. B. Jeffery
By Burton and Burton
Attorneys.

UNITED STATES PATENT OFFICE.

THOMAS B. JEFFERY, OF CHICAGO, ILLINOIS.

VELOCIPEDE-SADDLE.

SPECIFICATION forming part of Letters Patent No. 496,880, dated May 9, 1893.

Application filed March 23, 1891. Serial No. 385,962. (No model.)

*To all whom it may concern:*

Be it known that I, THOMAS B. JEFFERY, a citizen of the United States, residing at Chicago, county of Cook, and State of Illinois, have invented certain new and useful Improvements in Velocipede-Saddles, which are fully set forth in the following specification, reference being had to the accompanying drawings, forming a part thereof.

In the drawings, Figure 1 is a side elevation of my improved saddle and support, seat leather being shown in vertical section. Fig. 2 is a plan of the supporting springs and the piece to which they are secured. Fig. 3 is a section at the line 3—3 on Fig. 1. Fig. 4 is a section at the line 4—4 on Fig. 3. Fig. 5 is a detail side elevation of a modified form of the longitudinally movable pivotal connection of the front spring to the seat.

A is the seat leather.

B B' are respectively the front and rear stretchers,—that is, the rigid parts to which the two ends of the seat leather are secured respectively, said stretchers being adapted to be secured together and adjustable longitudinally to suitably stretch the seat leather.

C is the front spring.

D is the rear spring.

E is the saddle support, to which the two springs C and D are secured at the opposite ends of said support.

F represents any fixed portion of the frame, to which the saddle support is attached.

K is a clamping block, L, a clamp, and M, a clamp-screw, by which the saddle support E is clamped to the frame.

The springs C and D are made substantially alike except as to size and the number of coils. Each is made of wire folded to form two longitudinal arms C' C' and D' D' respectively, leaving a transverse portion $C^2$ and $D^2$ between said longitudinal arms at which the saddle is connected to said springs as hereinafter explained. Each of the arms extends from the transverse portion forward, and said arms are coiled at their forward end, the coils $C^3 C^3$ and $D^3 D^3$ terminating the wire of which the springs respectively are composed, the two ends of each wire being thus brought near together at the inner ends of the respective coils.

The saddle support E is a flat strap or bar bent as shown in Fig. 1, so that the middle part E' has vertical curvature and the rear end terminates in an upwardly concave seat $E^2$ for the coils $D^3 D^3$ of the spring D, while the forward end terminates in a downwardly concave seat $E^3$ for the coils $C^3 C^3$ of the spring C, and the end portions of said coils respectively are bound to the said bar at their respective seats described, by the T bolts N and G, respectively, the cross of the T of said bolts upon the two ends of the wire of the coils binding them onto the seats when the nuts $n$ and $g$, respectively, are tightened on the convex sides of the seats. The middle transverse portion $D^2$ of the spring D is lodged in a bearing $H^2$ on the clip H, which is secured to the rear stretcher B.

I have shown two alternative methods of connecting the front spring C to the saddle stretcher,—the first shown in Fig. 1, wherein the transverse portion $C^2$ is lodged in a bearing I', which slides in a loop I, riveted to the under side of the stretcher B, so that said portion $C^2$ can slide longitudinally with respect to the saddle, thus accommodating itself to the changing position of the saddle as the springs yield and cause their arms D' and C', respectively, to move as if pivoted at the center of their respective coils $C^3$ and $D^3$. In such action, it is evident that the saddle will be carried rearward by the spring D as the upper ends of the springs are depressed, and if there were no longitudinal play allowed at the connection of the spring C with the saddle, such movement of the saddle would result from depression at either end, because both ends would have to descend together, controlled by the similar arms C' and D', but, by allowing such play, either end of the saddle may be depressed against the resistance of the spring at the depressed end without necessarily depressing the other end to bring into operation its spring except as a pivot over which the saddle will rock when depressed at the opposite end. In lieu of the loop I, I design in some cases to employ the link J, pivoted at its lower end to the hanger J', and having its upper end provided with the pivotal seat for the portion $C^2$ of the spring C, the longitudinal play of that end of the spring being thus obtained by the swinging of the link over its pivot on the hanger.

It will be observed that the spring coils C³ and D³ of the springs C and D, are, in effect, pivotal connections of the arms C' and D' to the saddle support, and that, in this view, the said arms C' and D' are, in effect, parallel links connecting the saddle and support, for which, said coils, in addition to being equivalent to pivots, are also spring supports tending to uphold the links and thereby the saddle. Considering the construction in this view, it is a material feature that the said links,—the arms C' and D',—are connected to a stretcher which joins the opposite ends of the seat leather, as distinguised from being connected, respectively, to the said opposite ends of the seat leather. The stretcher being thus entirely independent of the spring supports, the weight of the rider tending to sag the seat leather has no tendency to draw the ends of the arms C' and D' toward each other, their action being, on the contrary, precisely the same as if the seat were a rigid instead of a tensile one. It should also be noticed as a desirable feature that both the connections of said links C' and D' to the saddle support E,—viz: at the coil springs C³ and D³, respectively,—are underneath the saddle, as distinguished from being either of them farther forward or rearward than the saddle. The convenience of thus gathering all the devices up under the saddle, so that none of them are in the way of the clothing or an obstruction to mounting, is important. It should be noticed, also, that whereas the stretcher is necessarily composed of two pieces which can be adjusted with respect to each other to stretch the seat leather, both the said links or arms C' and D' are connected to the same one of the said two pieces of the stretcher, so that the stretching of the seat by adjusting the stretcher does not affect the relation of the spring arms to each other or to the support E. It should also be noticed, as a point of convenience, that the pivotal connection of one of said links or spring arms,—to-wit, the arms C' to the saddle, is substantially under the middle point of the length of the saddle, whereby it is brought substantially in vertical line with the center of gravity of the rider at ordinary positions.

The device for clamping this saddle to the frame, comprising the clamping block K and clamping bolt M; and the shape of the saddle support at the point where such clamp is applied, are desirable features. It should be noticed, first, that the part E' of the saddle support E, where the clamp is applied, is curved vertically. The saddle support and thereby the saddle will be changed in inclination in respect to the frame by sliding the said support E in the arc of this curved portion through the clamp, the saddle in such motion rocking or being tilted in an arc about the center of said curve, and it is for the purpose of permitting such adjustment to accommodate the preference of the rider that this saddle support is so formed. The clamp block K is correspondingly curved fore-and-aft on its upper side, so that it obtains firm grasp upon the bar when it is clamped. This clamp block on its under side has a suitable seat K' for the portion F of the frame, to which the saddle is secured. As illustrated, said frame being represented as tubular, this seat is transversely concave, but it is not essential that it conform in transverse outline to the shape of the frame bar F, the important circumstance with regard to its shape being that it conforms longitudinally to the bar,—that is, that it is straight, so that no fore-and-aft rocking action can obtain between said clamp block and the frame bar F. The clamp L, it will be understood, extends transversely around the saddle support E, and clamp block, and is provided with a clamp bolt M, to draw it tight around said parts when the saddle has been adjusted to the desired angle. In order that the clamping block may be securely retained within the clamp, even when the nut is loose so that it is not in danger of being lost by an accidental loosening of the nut, it is provided with the flanges K² K², which embrace the edges of the clamp on both sides when it is in operative position, these flanges being of such height that the block cannot escape from the clamp when the clamp is on the saddle-supporting bar E. The bar can, however, be passed into the clamp, notwithstanding the flanges, before the clamp is passed onto the bar E, and the bar being then inserted through the clamp above the block operates as a key to prevent the escape of the clamp.

I claim—

1. In a velocipede saddle, in combination with the saddle support, the seat-supporting arms connected thereto, said saddle support having one or more curved seats and said seat-supporting arms being one or both provided with curved portions adapted to rest in said seats; and clamps which bind them therein; whereby said seat-supporting arms one or both have angular adjustment in a vertical plane with respect to the saddle support: substantially as set forth.

2. In a velocipede saddle, the saddle support consisting of a flat bar having a vertically curved portion intermediate its ends; and a clamp adapted to bind the bar at such curved portion to the frame, the ends of said bar having vertically curved portions, combined with supports for the seat, whose curved ends are adapted to seat respectively in the curved end portions of said bar, and clamping devices adapted to bind them in their seats, whereby said supports have angular adjustability in a vertical plane in respect to the seat-supporting bar, and the said bar has angular adjustability in a vertical plane in respect to the frame: substantially as set forth.

3. In a velocipede saddle, in combination with the saddle support having curved seats at its ends, the seat-supporting arms terminating in spring coils at their lower ends, said coils being adapted to seat in the curved seats of the saddle support; and clamps which bind them therein, whereby said coils adapt the arms to be adjustable angularly in a vertical plane, and at the same time afford spring support for the arms and thereby for the seat: substantially as set forth.

In testimony whereof I have hereunto set my hand, at Chicago, Illinois, in the presence of two witnesses, this 18th day of March, 1891.

THOS. B. JEFFERY.

Witnesses:
CHAS. S. BURTON,
JEAN ELLIOTT.